(12) United States Patent
Hommel

(10) Patent No.: US 6,208,923 B1
(45) Date of Patent: Mar. 27, 2001

(54) FAULT-TOLERANT ELECTROMECHANICAL STEER-BY-WIRE STEERING ACTUATOR

(75) Inventor: Mathias Hommel, Korntal (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 09/350,454

(22) Filed: Jul. 9, 1999

(30) Foreign Application Priority Data

Aug. 1, 1998 (DE) .............................................. 198 34 870

(51) Int. Cl.$^7$ ................................. B60Q 1/34; B62D 5/04
(52) U.S. Cl. .............................. 701/42; 701/41; 340/465; 180/400; 180/402; 180/422; 180/427; 180/442; 180/446
(58) Field of Search ................................. 701/42, 41, 43; 303/100; 180/79.1

(56) References Cited

U.S. PATENT DOCUMENTS

| | | | |
|---|---|---|---|
| 4,869,334 | * 9/1989 | Marumoto et al. | 180/79.1 |
| 4,959,787 | * 9/1990 | Morishita et al. | 364/424.05 |
| 5,247,441 | * 9/1993 | Serizawa et al. | 701/41 |
| 5,327,986 | * 7/1994 | Saita | 180/79.1 |
| 5,335,979 | * 8/1994 | Nation et al. | 303/100 |
| 5,360,077 | * 11/1994 | Nishimoto et al. | 180/79.1 |
| 5,440,487 | * 8/1995 | Althoff et al. | 364/424.05 |
| 5,912,539 | * 6/1999 | Sugitani et al. | 318/434 |
| 6,018,691 | * 1/2000 | Yamamoto et al. | 701/41 |
| 6,032,091 | * 2/2000 | Noro et al. | 701/42 |
| 6,097,286 | * 8/2000 | Discenzo | 340/465 |
| 6,098,296 | * 8/2000 | Perisho, Jr. et al. | 33/203 |
| 6,138,788 | * 10/2000 | Bohner et al. | 180/405 |

OTHER PUBLICATIONS

English Translation of Abstract Only.

* cited by examiner

Primary Examiner—William A. Cuchlinski, Jr.
Assistant Examiner—Tuan C To
(74) Attorney, Agent, or Firm—Baker & Daniels

(57) ABSTRACT

An electromechanical steering actuator for a steer-by-wire application in motor vehicles. An electronic closed-loop/open-loop control system generates steering signals for a pair of electric servomotors, which act via a gear unit on a steering control element of a rack-and-pinion steering system. The closed-loop/open-loop control system includes a pair of process computers which deliver corrective signals to the servomotors via drive units. The steering actuator is divided into two diversely redundant systems including two redundant process computers, each of which delivers corrective signals via two redundant drive units to two servomotors which act on a common steering shaft.

13 Claims, 1 Drawing Sheet

FAULT-TOLERANT ELECTROMECHANICAL STEER-BY-WIRE STEERING ACTUATOR

BACKGROUND OF THE INVENTION

The invention proceeds from an electromechanical steering actuator, in particular for steer-by-wire application in motor vehicles, with an electronic closed-loop/open-loop control system that generates steering signals for an electric servomotor, which acts via a gear unit on a steering control element. In particular the servomotor acts on a rack of a rack-and-pinion steering system. The closed-loop/open-loop control system comprising a process computer that delivers corrective signals to the servomotor via a drive unit.

Such a steering actuator is known, for example, from DE 195 40 956. In the known electromechanical steering actuator, the mechanical connection between the steering column and the rack of the rack-and-pinion steering system can be broken to permit steer-by-wire steering. In the event of a fault in the power-assisted or the automatic steering system, this additional system is shut down and the driver regains mechanical control over the wheels to be steered. The known steering actuators for an automatic steering mode are not completely fault-tolerant.

In a vehicle with a steer-by-wire system, where there is no longer a mechanical connection between the steering wheel and the gear unit, care must be taken to ensure that the steering actuator is fault-tolerant.

SUMMARY OF THE INVENTION

It is, therefore, an object of the present invention to provide a fault-tolerant electromechanical steering actuator that permits a correct steer-by-wire steering function in the event of a fault, regardless of the subsystem in which it occurs.

Owing to the fact that, according to the present invention, the steering actuator is divided into two diversely redundant systems, the closed-loop/open-loop control system comprising two diversely redundant process computers each of which delivers the corrective signals, via a diversely redundant drive unit assigned to it, to two diversely redundant servomotors acting on the same steering shaft, the steering system remains fully available even in the event of a fault, regardless of the subsystem in which the fault occurs.

During normal operation, the first of the systems is operating and the second system is passive. Here, "passive" means that although the passive process computer is not generating any corrective signals for its assigned servomotor, it is still being powered by its assigned voltage supply device, i.e., it is in a standby mode, in which, however, it can still exchange information with the active process computer, receive information from the higher-level vehicle computer and receive position measurement signals from the position sensor.

The currently active process computer controls its assigned electric servomotor via the drive unit connected therebetween, exchanges information with the passive process computer, and receives position measurement signals from the position sensor and information from the higher-level vehicle computer. The currently active process computer further receives the phase voltages or phase currents from the other electric servomotor assigned to the passive process computer.

The two process computers constantly exchange their computed actual positions and fault information (watchdog function). In the event of a fault, the process computer of one system shuts down the other system via no-current-opening relays.

Two types of system-generated faults can occur:

Mode I: Here the position sensor is defective;

Mode II: In this case, any other subsystem in the two systems A or B is defective.

(It is assumed that all mechanical parts, such as shafts and gears, are designed and laid out so as to withstand normal loads and stress loads.)

When a fault of the Mode II class occurs, the system that has been passive becomes active and the system in which the fault occurred is shut down. If the system that has been passive fails, the active system naturally remains active. If the active system fails, on the other hand, the passive system becomes active.

Further objects and characteristics of the invention will be described in detail hereinbelow with reference to an exemplary embodiment of the electromechanical steering actuator according to the invention.

DESCRIPTION OF THE PREFERRED EMBODIMENT

Figure 1:
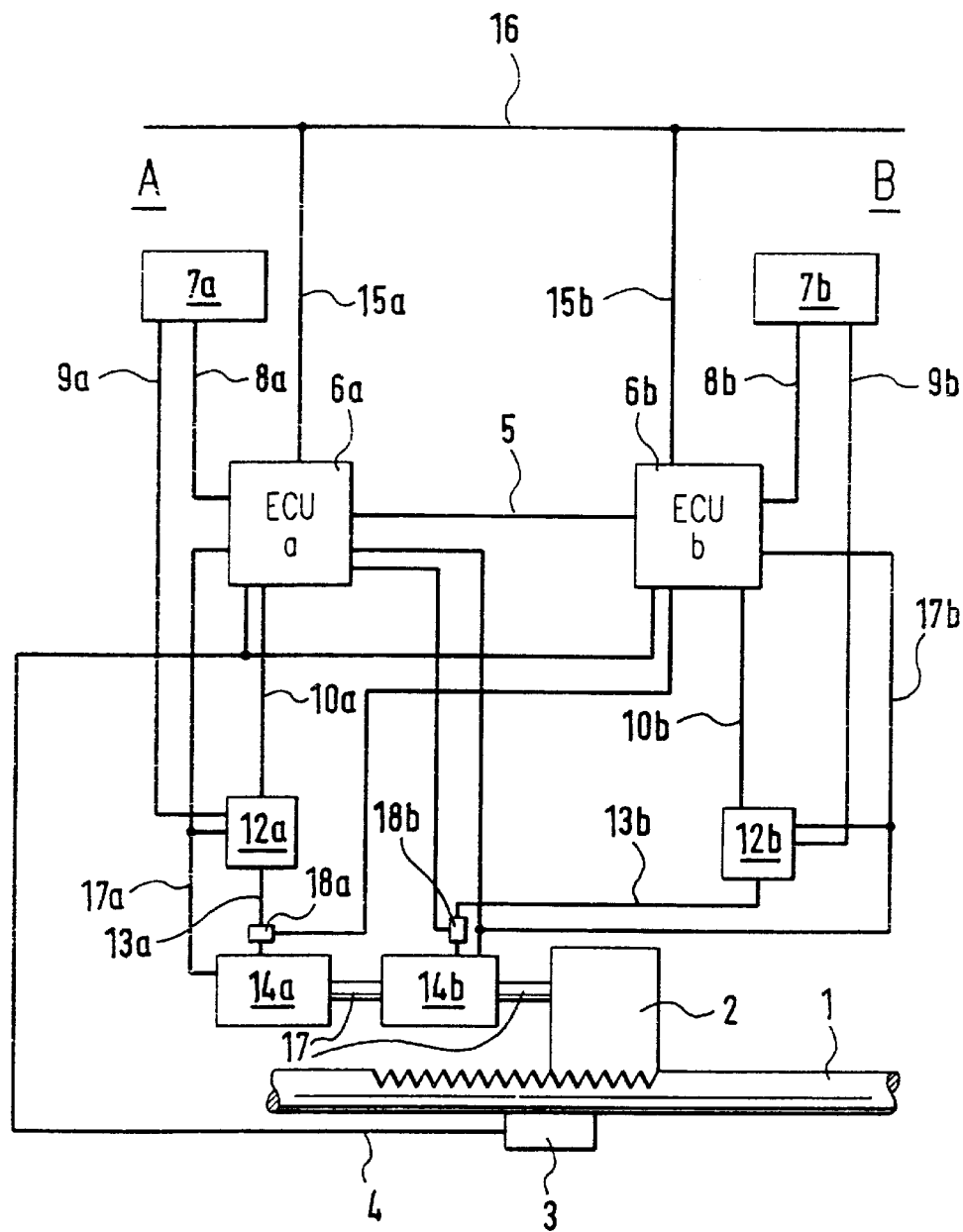
FIG. 1 is a schematic functional block diagram of the invention.

As shown in FIG. 1, the electromechanical steering actuator according to the invention consists of a steering control element 1, in the exemplary embodiment the rack of a rack-and-pinion steering system, two diversely redundant process computers 6a, 6b, two diversely redundant electric servomotors 14a, 14b, two diversely redundant drive units 12a, 12b to drive servomotors 14a, 14b, two diversely redundant power supply devices 7a, 7b, a position sensor 3, a gear unit 2 and a fault-tolerant data bus 16, which connects process computers 6a, 6b to a higher-level vehicle computer (not shown).

The functioning and design of the fault-tolerant data bus and of the higher-level vehicle computer are not subjects matter of this invention and therefore will not be described. As will be appreciated from the drawing, the steering actuator is divided into two diverse systems A and B of mutually similar design.

The following description distinguishes between two operating modes: normal operation, in which all the components are able to function, and fault mode, in which a fault has occurred. The design of the steering actuator will be described hereinbelow with reference to both operating modes.

Normal Operation

During normal operation, System A is operating and System B is passive. A power supply device 7a assigned to System A supplies process computer 6a and motor drive unit 12a with voltage applied via electrical connections 8a and 9a, respectively. Power supply device 7a can be a battery and/or a generator. Process computer 6a receives information concerning the driving condition of the vehicle and the desired steering movement to be executed by electric servomotor 14a assigned to System A from the higher-level vehicle computer via a data connection line 15a with the data bus 16.

To be able to effect the positioning action of steering control element 1, i.e., the steering, active process computer 6a receives inputs via a connecting line 4 of the actual position of steering control element 1 supplied by position sensor 3, and also the phase voltages or phase currents of electric servomotor 14b assigned to passive system B. This creates an external, higher-level control loop.

Electric servomotor 14b is an asynchronous alternating-current motor or an EC [electrically commutated] motor, and since during normal operation this motor co-rotates on common shaft 17 without being electrically powered and behaves as a generator, the process computer 6a can compute its rotation speed from the signals derived from the phase currents or phase voltages of electric servomotor 14b and draw conclusions as to the relative position of steering control element 1. In this way it is possible to have a second position sensor in addition to position sensor 3 based on another physical principle.

Furthermore, the two process computers 6a and 6b of the two systems A and B constantly exchange their computed actual positions and fault data (watchdog function) and, in the event of a fault, shut down the respective other system via no-current-opening relays 18a and 18b. That is, connecting lines lead from each process computer 6a or 6b, respectively, to relay 18b or 18a, respectively, of the respective other system.

If the position information read by position sensor 3 or calculated from the phase currents or phase voltages of the passively co-rotating electric servomotor is correct, process computer 6a imposes, via a connecting line 10a, a desired current to drive unit 12a, which in turn, by means of the power electronics it contains, drives electric servomotor 14a via electrical connections 13a. This constitutes an internal, lower-level control loop.

Electric servomotor 14a can be a continuously excited direct-current motor, but should differ from the other electric motor 14b in its operating principle.

As described hereinabove, during normal operation electric servomotor 14b assigned to passive system B rotates passively with the common shaft 17.

In system B, power supply device 7b supplies process computer 6b and drive unit 12b with voltage via electrical connecting lines 8b and 9b and can be a battery and/or a generator, although its physical principle of operation must be different from that of voltage supply 7a.

Process computer 6b also receives information concerning the driving condition of the vehicle and the desired steering movement to be executed by the steering actuator from the higher-level vehicle computer via an electrical connecting line 15b with data bus 16.

Fault Mode

Two types of system-generated faults can occur. On the one hand, position sensor 3 can be defective (Mode I); and on the other hand, any other subsystem, i.e., the devices of either system A or system B, can be defective (Mode II).

Mode II:

In this type of fault, the respective other system is active and the system in which the fault has occurred is shut down. If system B fails—if its process computer or servomotor is defective, for example—system A naturally remains active. If system A fails, on the other hand, system B becomes active.

To be able to effect the positioning action of steering control element 1, process computer 6b of second system B inputs the actual position of steering control element 1 delivered by position sensor 3 (external, higher-level control loop) and imposes, via connecting line 10b, a desired current for drive unit 12b, which in turn, by means of the power electronics it contains, drives the assigned servomotor 14b via electrical connecting lines 13b (internal, lower-level control loop).

Mode I:

Should position sensor 3 fail, system A is able to compute the current position of steering control element 1, i.e., the current steering angle, via the generator-type operation of electric servomotor 14b and with the aid of a vehicle model.

In the above description it is basically assumed that system A is active and system B is passive in the normal case, and that a changeover to the second system B occurs in fault mode II.

According to another safety philosophy, the active state can be assigned to both systems A and B in mutual alternation. The exchange of the active state can be set to occur either periodically or as a function of the driving conditions of the vehicle, such as mileage, etc. To achieve this, however, the physical principle of both servomotors must be such that a position signal can be calculated from the acquisition of their phase voltage or phase current.

The foregoing description makes it clear that the electromechanical steering actuator according to the invention is fault-tolerant when a fault occurs, so that the steering system remains fully available in such cases. All the components are therefore configured as diversely redundant.

What is claimed is:

1. A steering actuator for a steer-by-wire system for a motor vehicle, said vehicle having both a wheel and a steering wheel, said steering actuator comprising:

two drive units, each said process computer providing corrective signals to one of said drive units;

two servomotors, respectively connected to one of said drive units; and a steering control element connected to both said servomotors and to said wheel, said drive units, said process computers, and said servomotors forming respective redundant steering control systems.

2. The actuator according to claim 1, wherein said control system includes an electronic closed control loop and an electronic open control loop.

3. The actuator according to claim 1 including a first power supply connected to a first of said process computers and comprising one of a battery and a generator, a second power supply connected to a second of said process computers and comprising one of a battery and a generator, wherein said power supply is a different type than said first power supply.

4. The actuator according to claim 3, wherein each said process computer includes a means for disabling said other process computer when a fault is detected.

5. The actuator according to claim 4, wherein said means for disabling comprises a power interrupter to interrupt a supply of power to said other process computer.

6. The actuator according to claim 1, wherein said two process computers are of two different types and exchange data and fault messages.

7. The actuator according to claim 1 including a data channel connected to both said two process computers, said data channel supplying data to said process computer regarding the driving condition of said vehicle and the steering angle to be assumed by said wheel.

8. The actuator according to claim 1 including two position sensors connected to said shaft and said process computers.

9. The actuator according to claim 8, wherein a first said position sensor comprises an absolute displacement transducer which measures an excursion of said steering control element, generates a measurement signal, and sends said measurement signal to both said process computers.

10. The actuator according to claim 8, wherein one of said position sensors comprises means for generating a measurement signal relating to one of a phase voltage and a phase current of one of said servomotors while said servomotor is not energized.

11. The actuator according to claim 1, wherein only one of said servomotors is one of an EC motor and a three-phase asynchronous machine.

12. The actuator according to claim 1 including a shaft connected to both said servomotors, and a gear element connected to said shaft, said gear element connected to said steering control element for converting movement of said shaft into steering movement of said wheel.

13. The actuator according to claim 12 wherein said gear element receives inputs from both said shaft and a steering wheel.

* * * * *